(12) United States Patent
Sorrells et al.

(10) Patent No.: US 6,720,866 B1
(45) Date of Patent: Apr. 13, 2004

(54) RADIO FREQUENCY IDENTIFICATION TAG DEVICE WITH SENSOR INPUT

(75) Inventors: Peter Sorrells, Chandler, AZ (US); Shannon Poulin, Tempe, AZ (US); Lee Furey, Phoenix, AZ (US); Sam Alexander, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 09/280,466

(22) Filed: Mar. 30, 1999

(51) Int. Cl.$^7$ ................................................ H04Q 5/22

(52) U.S. Cl. ................. 340/10.4; 340/10.34; 340/10.41

(58) Field of Search ............................. 340/10.4, 10.41, 340/10.42, 10.5, 10.33, 10.34, 5.61, 870.28, 870.26, 825.49, 5.8, 539, 870.31, 825.36; 375/306, 303; 342/42, 44; 701/117, 35

(56) References Cited

U.S. PATENT DOCUMENTS

| | | | | |
|---|---|---|---|---|
| 3,656,132 A | * | 4/1972 | Brumbelow | 340/870.28 |
| 4,167,727 A | * | 9/1979 | Anderson et al. | 714/805 |
| 5,235,326 A | * | 8/1993 | Beigel et al. | 340/10.41 |
| 5,805,063 A | | 9/1998 | Kackman | |
| 5,959,529 A | * | 9/1999 | Kail, IV | 340/539.12 |
| 5,974,368 A | * | 10/1999 | Schepps et al. | 340/5.61 |
| 6,249,212 B1 | * | 6/2001 | Beigel et al. | 340/10.34 |

* cited by examiner

*Primary Examiner*—Michael Horabik
*Assistant Examiner*—William Bangachon
(74) *Attorney, Agent, or Firm*—Baker Botts L.L.P.

(57) ABSTRACT

A radio frequency identification tag device having a sensor input which modifies a tag data word bitstream read by an interrogator/tag detector. The sensor input may be a switch contact(s), digital and/or analog. The sensor input may be voltage, current, pressure, temperature, resistance, acceleration, moisture, gas and the like. Power from the radio frequency interrogator/tag reader may be used to power the circuits of the radio frequency tag device, which in turn may supply power to any sensor connected thereto.

30 Claims, 12 Drawing Sheets

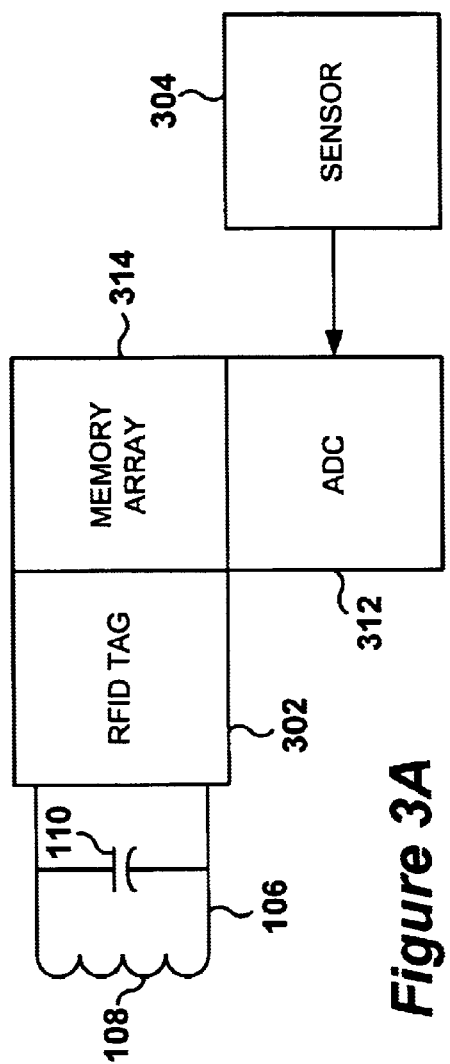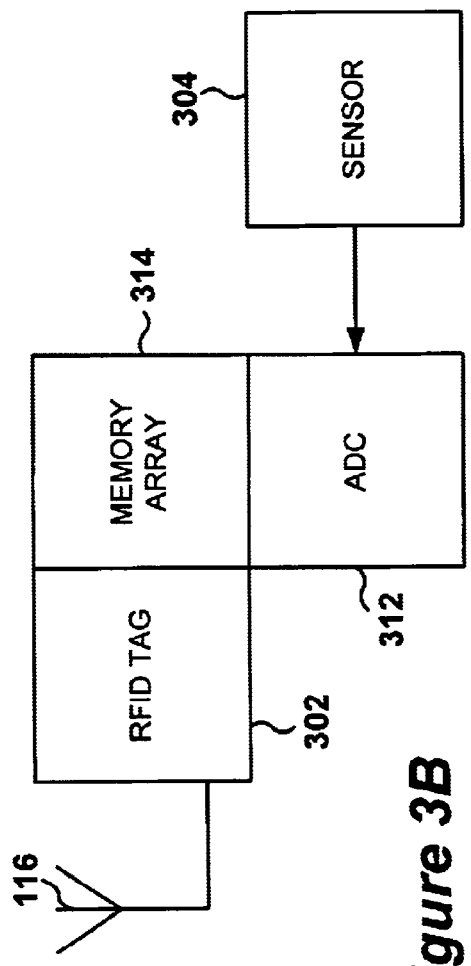
Figure 3A
Figure 3B

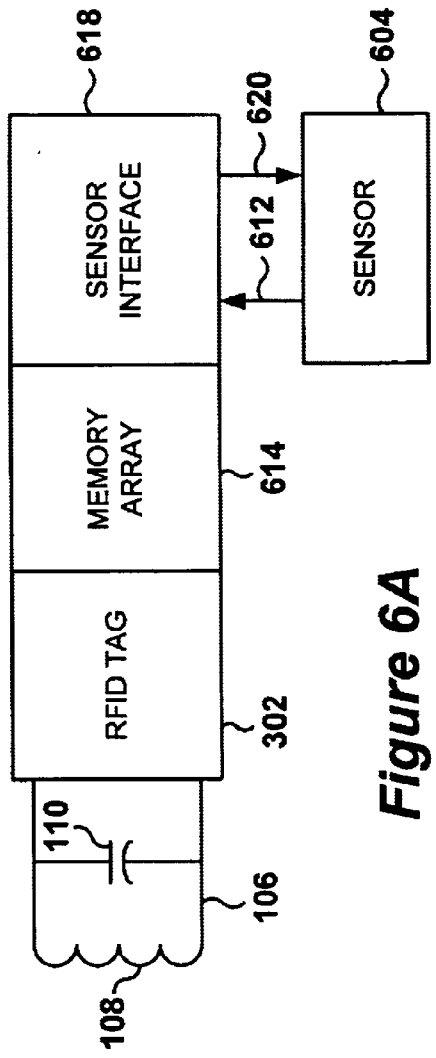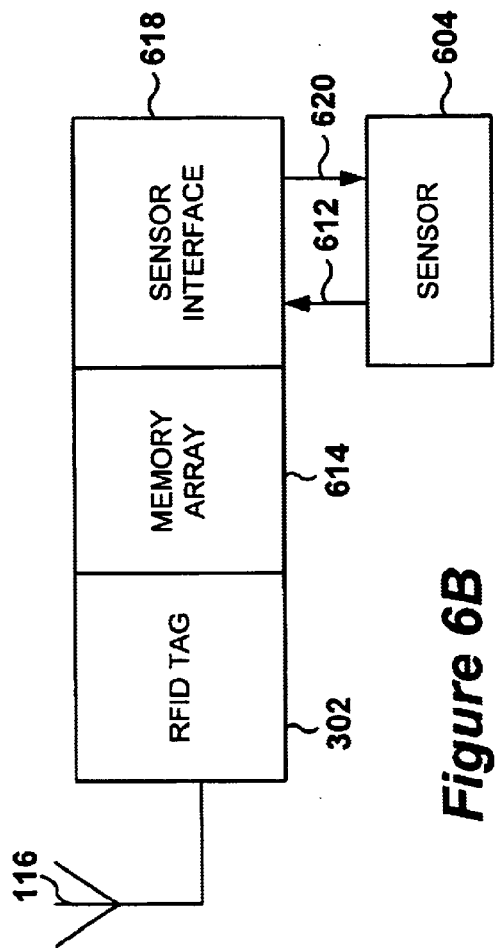
*Figure 6A*
*Figure 6B*

| 802 | 8 | 2 | A | 1 | 2 | 3 | 4 | 5 | 6 | 7 | 8 | 9 | A | B | C | D | E | F |
|---|---|---|---|---|---|---|---|---|---|---|---|---|---|---|---|---|---|---|
| 804 | 1000 | 0010 | 1010 | 0001 | 0010 | 0011 | 0100 | 0101 | 0110 | 0111 | 1000 | 1001 | 1010 | 1011 | 1100 | 1101 | 1110 | 1111 |

| 802 | 8 | 2 | A | 1 | 2 | 3 | 4 | 5 | 6 | 7 | 8 | 9 | A | B | C | D | E | F |
|---|---|---|---|---|---|---|---|---|---|---|---|---|---|---|---|---|---|---|
| 804 | 0111 | 1101 | 0101 | 1110 | 1101 | 1100 | 1011 | 1010 | 1001 | 1000 | 0111 | 0110 | 0101 | 0100 | 0011 | 0010 | 0001 | 0000 |

| 8 | 2 | A | 1 | 2 | 3 | 4 | 5 | 6 | 7 | 8 | 9 | A | B | C | D | - | - | - |
|---|---|---|---|---|---|---|---|---|---|---|---|---|---|---|---|---|---|---|
| 1000 | 0010 | 1010 | 0001 | 0010 | 0011 | 0100 | 0101 | 0110 | 0111 | 1000 | 1001 | 1010 | 1011 | 1100 | 1101 | 0000 | 0000 | X |

| 8 | 2 | A | 1 | 2 | 3 | 4 | 5 | 6 | 7 | 8 | 9 | A | B | C | D | - | - | - |
|---|---|---|---|---|---|---|---|---|---|---|---|---|---|---|---|---|---|---|
| 1000 | 0010 | 1010 | 0001 | 0010 | 0011 | 0100 | 0101 | 0110 | 0111 | 1000 | 1001 | 1010 | 1011 | 1100 | 1101 | 0111 | 1111 | X |

| 8 | 2 | A | 1 | 2 | 3 | 4 | 5 | 6 | 7 | 8 | 9 | A | B | C | D | - | - | - |
|---|---|---|---|---|---|---|---|---|---|---|---|---|---|---|---|---|---|---|
| 1000 | 0010 | 1010 | 0001 | 0010 | 0011 | 0100 | 0101 | 0110 | 0111 | 1000 | 1001 | 1010 | 1011 | 1100 | 1101 | 1111 | 1111 | X |

RADIO FREQUENCY IDENTIFICATION TAG DEVICE WITH SENSOR INPUT

BACKGROUND OF THE INVENTION

This invention relates generally to radio frequency identification tag devices, and more particularly, to a radio frequency identification tag device with a sensor input which modifies a tag data word bitstream read by a tag interrogator/detector.

DESCRIPTION OF THE RELATED TECHNOLOGY

Radio frequency identification (RFID) tag devices may be used in managing inventory, automatic identification of cars on toll roads, security systems, electronic access cards and the like. RFID tag devices will work under more hostile environmental conditions than bar code labels since the RFID tag device may be read through paint, water, dirt, dust, human bodies, concrete, or through the tagged item itself. RFID tag devices are used in conjunction with a radio frequency tag reader (interrogator) which generates a continuous wave (CW) radio frequency (RF) carrier that activates the RFID tag device at close range. The RFID tag device is passive and has no internal power sources, rather it uses some of the power in the CW RF carrier to power internal circuits that read a stored internal digital code and cause the RFID tag device to signal its stored internal digital code to the tag reader.

The RFID tag device modifies the amplitude of the CW carrier of the interrogator by loading and unloading a resonant circuit which is tuned to the CW carrier. The RFID tag device comprises, for example, a parallel resonant circuit or antenna tuned to the frequency of the radio frequency CW carrier, an RF to direct current (DC) converter, a circuit for loading and unloading the parallel resonant circuit/antenna, logic which stores the internal digital code, logic which reads the internal digital code and causes the circuit for loading and unloading the parallel resonant circuit/antenna to operate in co-operation with the internally stored digital code.

The internal digital code of the RFID tag device, like information on a bar code, is normally fixed and cannot be changed except by command from the interrogator. There are situations where an RFID tag device is associated with a piece of equipment such as a valve, a process monitor, etc., having variable status or information. This variable status or information may be, for example, from a binary on/off switch(es); an analog sensor detecting pressure, temperature, voltage, current, speed, moisture, pH, etc.; or a digital value from a counter or output of an analog to digital converter. Generally, means other than the RFID tag device is required to read this variable status or information. For example, contact or connection with the switch, sensor or digital value; visually reading a display value, or using an active RF system which continuously consumes power.

Therefore, what is needed is a more cost effective, simple and reliable system, method and apparatus for obtaining variable status or information from a tagged item.

SUMMARY OF THE INVENTION

The invention overcomes the above-identified problems as well as other shortcomings and deficiencies of existing technologies by providing in an RFID tag device a sensor input adapted to receive variable signals from a switch(es), an analog variable or a digital variable. Typically, the RFID tag device amplitude modulates the CW RF carrier of the RF generator with its data word bitstream by loading and unloading the resonant tuned circuit or antenna of the RFID tag device in accordance with the binary values of that data word bitstream. The data word bitstream is a series of on/off pulses which represent, for example, a serial data word synchronization header, the RFID tag number, and, according to the embodiments of the invention, a sensor value(s). Parity bits or a checksum value may also be incorporated into the data word bitstream. These series of on/off pulses are detected by the tag reader/interrogator which determines amplitude variations of its CW RF signal. These amplitude variations are caused by the electro-magnetically coupled or RF antenna coupled RFID tag device loading and unloading the tuned circuit or antenna, respectively, of the tag reader/interrogator.

In accordance with an embodiment of the present invention, an RFID tag device has a digital input (on/off) for sensing a discrete change in voltage, current or resistance of a sensor connected to the digital input. The digital input sense state may determine whether a bit is set or cleared in the data word bitstream or whether the data word bitstream bit values may be inverted. Either way, the difference between the two data word bitstreams represent the change in the sensor (open or closed) which represents whatever the sensor represents, i.e., open or closed valve, circuit breaker on or tripped, and the like. A source of voltage or current for the sensor may be obtained from an external source, or from the RFID tag device itself which then supplies some of the power from the electro-magnetically coupled or RF antenna coupled CW from the interrogator/tag reader. The sensor may be an electromechanical switch, a transistor, a hall effect device, a photo-transistor and the like.

Another embodiment of the RFID tag device has a plurality of digital inputs (on/off) for sensing discrete changes in voltage, current or resistance of sensors or circuits connected to the plurality of digital inputs. The sense states of the digital inputs determine which ones of a plurality of bits are set or cleared in the data word bitstream. A source of voltage or current for the sensors or circuits connected to the digital inputs may be obtained from an external source or from the RFID tag device itself which uses some of the power from the electro-magnetically coupled or RF antenna CW from the interrogator/tag reader. The sensors or circuits connected to the digital inputs may be electromechanical switches, transistors, hall effect devices, photo-transistors, the output of an analog-to-digital converter, and the like.

Still another embodiment of the RFID tag device has an analog input for sensing an analog sensor signal represented by a variable voltage, current or resistance value. The analog input may be converted to a digital value by an analog-to-digital converter which is also part of the circuits of the RFID tag device. The analog input may also be converted to an on/off, high/low representation by a voltage comparator. A plurality of analog inputs may be used with the present invention, each analog input having a digital value. The plurality of analog inputs may be processed through an analog multiplexer into the analog-to-digital converter, and/or a voltage comparator. Voltage or current for powering the analog sensor(s) may be obtained from an external source, or from the RFID tag device which uses some of the power from the electro-magnetically coupled or RF antenna coupled CW from the interrogator/tag reader. The analog sensor(s) may be an RTD, thermocouple, piezo-electric pressure transducer and the like.

Yet another embodiment of the RFID tag device has a sensor built into the tag device itself. The sensed value may be for example: pressure, temperature, acceleration, vibration, moisture content, gas percentage, density, flow rate, light intensity, sound intensity, radiation, magnetic flux, pH, etc. The converted digital value read from the sensor input is transmitted as part of the data word bitstream. The analog output of the sensor may be converted to a digital value by an analog-to-digital converter within the RFID tag device. The analog sensor output may also be converted to an on/off, high/low representation by a voltage comparator. A plurality of analog sensor outputs may be converted within the RFID tag device into digital values. The plurality of analog sensor outputs may be processed through an analog multiplexer into an analog-to-digital converter, and/ or a voltage comparator. Voltage or current for powering the analog sensor(s) may be obtained from an external source, or from the RFID tag device which then supplies some of the power from the electro-magnetically coupled or RF antenna coupled CW from the interrogator/tag reader.

Any of the aforementioned embodiments may incorporate dual-purpose external connection pads in which the pad has one function before setting a lock function in the RFID tag device, and a separate function after locking the device or writing to a particular register. For example, a dual-function pad may be used as a reset function before locking a memory array, and as a digital input after locking the memory array.

The RFID tag device may be fabricated onto a single semiconductor integrated circuit die, or it may be comprised of a plurality of semiconductor dice in a single integrated circuit package. It is also contemplated and within the scope of the invention that multi-device RFID tags incorporating a plurality of discrete electronic devices, including but not limited to, microcontrollers, memories, digital logic circuits, analog circuits, and discrete and/or monolithic transducer/ sensors, may be fabricated into any of the aforementioned embodiments.

Features and advantages of the invention will be apparent from the following description of presently preferred embodiments, given for the purpose of disclosure and taken in conjunction with the accompanying drawings.

BRIEF DESCRIPTION OF THE DRAWINGS

FIGS. 3A and 3B are schematic block diagrams of embodiments of the invention adapted for connection to an analog sensor;

FIGS. 6A and 6B are schematic block diagrams of embodiments of the invention supplying power for operation of a sensor;

FIGS. 8a and 8b are schematic tables of data word bitstreams for different sensor states according to the invention;

FIGS. 9a–9c are schematic tables of data word bitstreams based upon changing sensor inputs, and;

DETAILED DESCRIPTION OF THE PREFERRED EMBODIMENTS

Figure 1A:
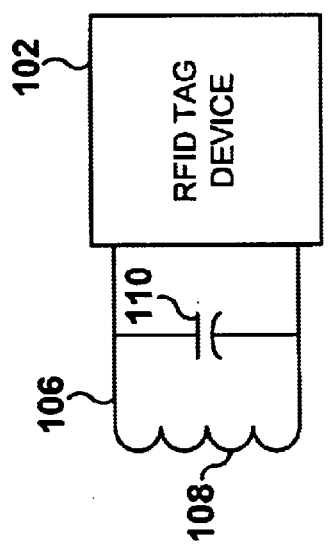
FIGS. 1A and 1B are schematic block diagrams of embodiments of the invention adapted for connection to an external sensor.

The invention is a radio frequency identification (RFID) tag device having a sensor input which causes logic circuits within the RFID tag device to modify an identification data word bitstream of the RFID tag device. The RFID tag device is passive, having no internal power storage, and relies upon power for its circuits from near-field or far-field continuous wave (CW) radio frequency (RF). Whenever the RFID tag device is in proximity to the CW RF field, the RFID tag device draws power from the field through electromagnetic or RF coupling. The amplitude of the CW RF carrier is affected by the RFID tag device being in proximity therewith. The CW RF generator has an interrogator which detects changes in the amplitude of the CW RF carrier and has a logic circuit which looks for a pattern(s) in these amplitude changes over a period of time. When a recognizable pattern is detected, an RFID tag device has been detected and information within the recognized pattern may be utilized.

Referring now to the drawings, the details of preferred embodiments of the invention are schematically illustrated. Like elements in the drawings will be represented by like numbers, and similar elements will be represented by like numbers with a different lower case letter suffix.

Figure 1B:
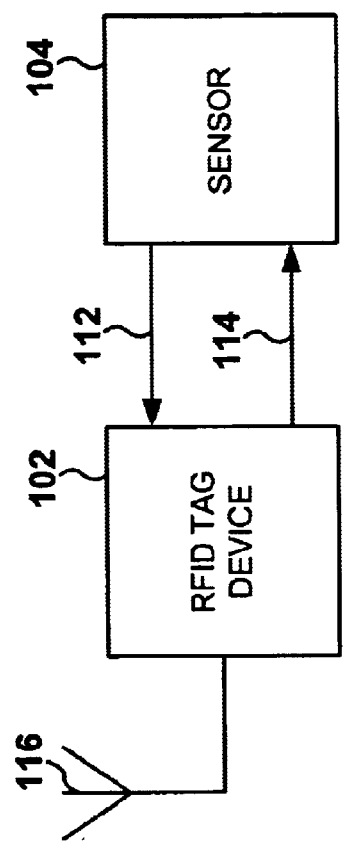

Referring now to FIGS. 1A and 1B, schematic block diagrams of embodiments of the invention, adapted for connection to external sensors, are illustrated. An RFID tag device 102 comprises a parallel tuned circuit 106 made up of an inductor 108 and a capacitor 110 (FIG. 1A), or a RF ultra high frequency (UHF) or microwave antenna 116 (FIG. 1B). The RFID tag device 102 has an input 112 adapted to receive a signal from a sensor 104. The sensor 104 may have two states, on or off, such as a switch, a transistor, a hall effect device, a photo-transistor and the like. The sensor 104 may also be analog, i.e., having a plurality of values that vary with time. The signal from the sensor 104 may be a voltage, current, resistance, frequency and the like. The RFID tag device 102 may also provide power to the sensor 104. Power to the sensor is represented by power connection 114. The RFID tag device 102 generates a data word bitstream that is read by an interrogator/tag reader 720 (see FIG. 7). Within this data word bitstream is information relating to a signal value from the sensor 104. When the signal value of the sensor 104 changes, so does the information of the data word bitstream. It is contemplated and within the scope of the present invention to have the sensor 104 in the same package as the RFID tag device 102. This results in a compact and cost effective packaged device that requires no internal power storage (batteries) and may be fabricated into a variety of shapes and applications.

Figure 2A:
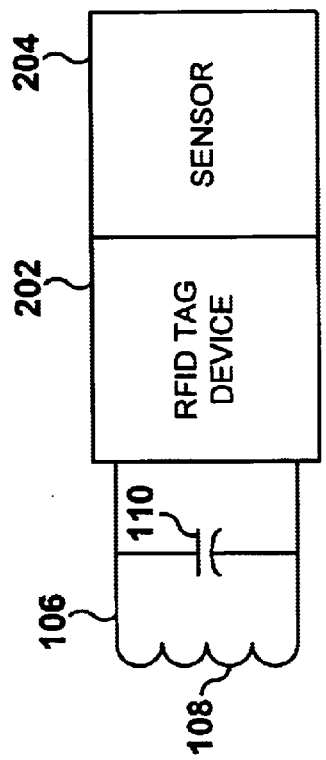
FIGS. 2A and 2B are schematic block diagrams of embodiments of the invention having an integral sensor.
Figure 2B:
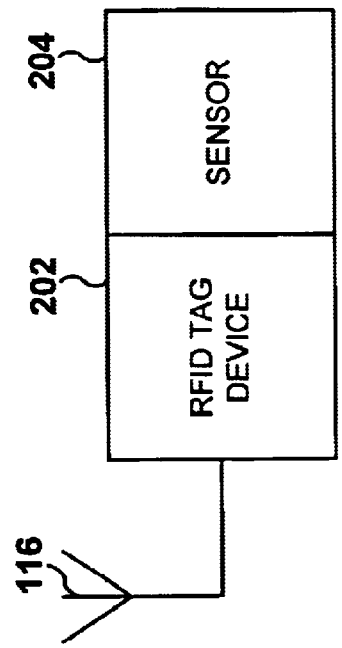

Referring now to FIGS. 2A and 2B, schematic block diagrams of embodiments of the invention having integral sensors are illustrated. An RFID tag device 202 and a sensor 204 are integral on an semiconductor integrated circuit die, or both are contained in an integrated circuit package (not illustrated). The sensor 204 may be binary digital (on/off), or it may be analog. The sensor 204 may be adapted to measure voltage, current, resistance, frequency, pressure, temperature, acceleration, vibration, moisture content, gas percentage, density, flow rate, light intensity, sound intensity, radiation, magnetic flux, pH, etc. The RFID tag device 202 generates a data word bitstream that is read by the interrogator/tag reader 720 (see FIG. 7). Within this data word bitstream is information relating to a value from the sensor 204. When the signal value of the sensor 204 changes, so does the information in the data word bitstream.

Referring now to FIGS. 3A and 3B, schematic block diagrams of embodiments of the invention adapted for connection to analog sensors are illustrated. An RFID tag device 302 comprises a parallel tuned RF circuit 106 made up of an inductor 108 and a capacitor 110 (FIG. 3A), or a RF ultra high frequency (UHF) or microwave antenna 116 (FIG. 3B). A memory array 314 stores a digital output from an analog-to-digital converter (ADC) 312. The ADC 312 is adapted to receive an analog output from an analog sensor 304. The analog sensor 304 may be external to, or part of, a package containing the RFID tag device 302, the memory array 314, and the ADC 312. The ADC 312 converts the analog output signal from the sensor 304 to a digital value of this signal. The memory array 314 stores the digital value and logic within the RFID tag device 302 and combines the stored digital value with other digital information in the data word bitstream. The data word bitstream may comprise, but not be limited to, a synchronization header, identification code, sensor value, and parity bits or a checksum. The data word bitstream is detected by a tag reader 720 (FIG. 7) and the value of the sensor 304 may be displayed from the information supplied by the tag reader 720.

Figure 4A:
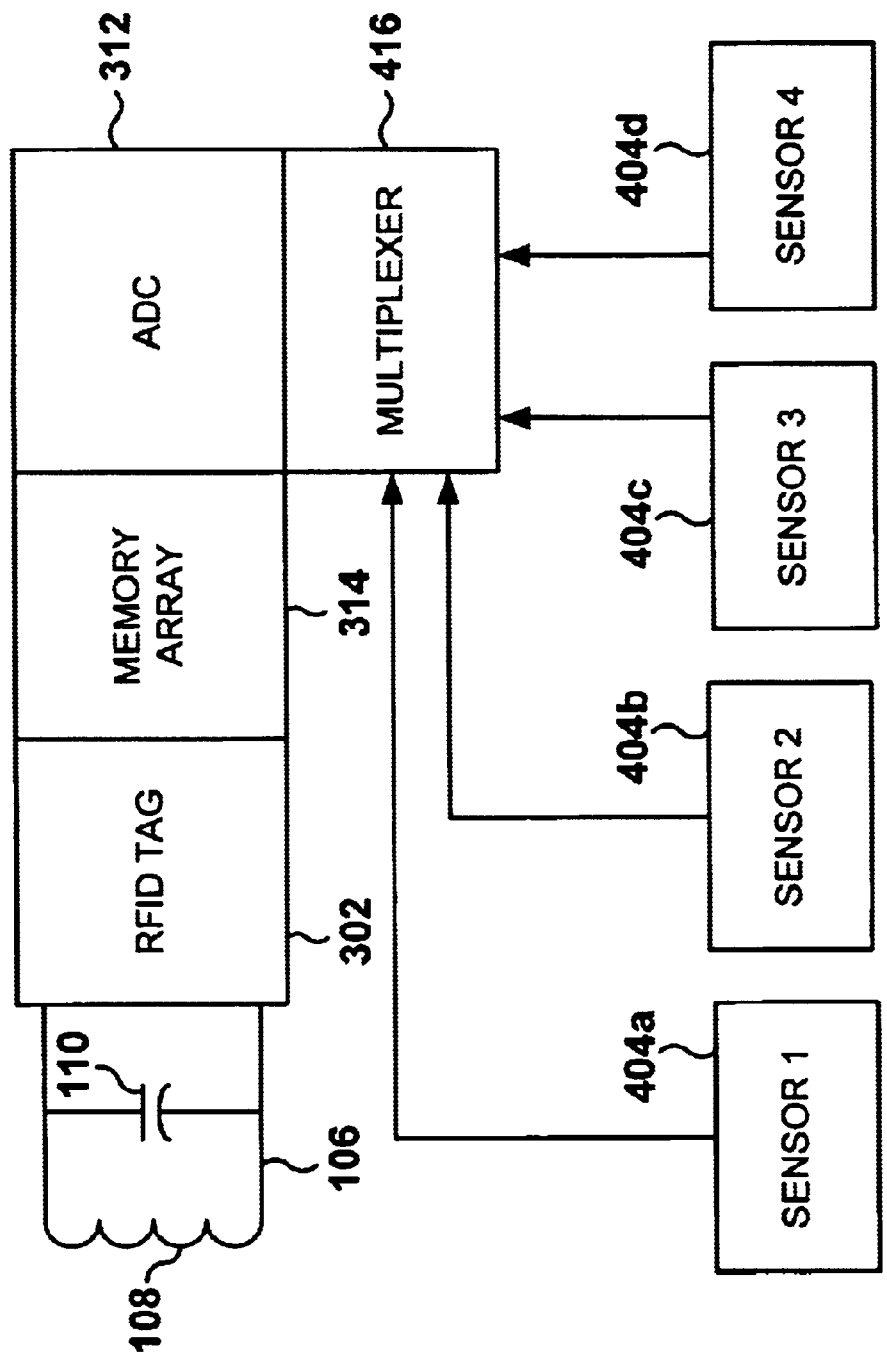
FIGS. 4A and 4B are schematic block diagrams of embodiments of the invention adapted for connection to a plurality of analog sensors.
Figure 4B:
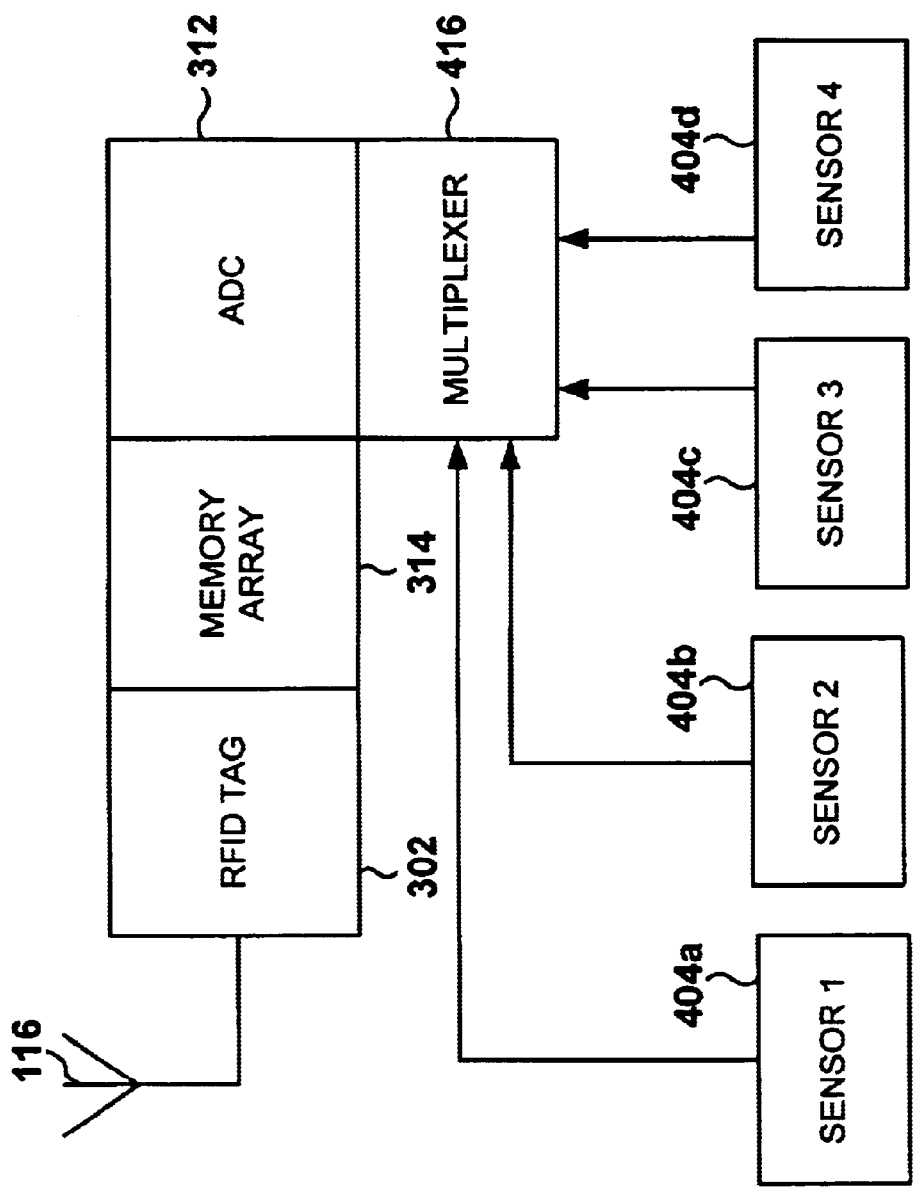

Referring to FIGS. 4A and 4B, schematic block diagrams of embodiment of the invention, adapted for connection to a plurality of analog sensors, are illustrated. The RFID tag device 302 comprises a parallel tuned RF circuit 106 made up of an inductor 108 and a capacitor 110 (FIG. 4A), or a RF ultra high frequency (UHF) or microwave antenna 116 (FIG. 4B). The memory array 314 stores digital outputs from an analog-to-digital converter (ADC) 312. The ADC 312 receives an analog output from an analog multiplexer 416. The analog multiplexer 416 selects the outputs from a plurality of analog sensors 404a–404d. The memory array 314 stores a digital value from the ADC 312 for each of the plurality of analog sensors 404a-404d. The digital values stored in the memory array 314 are combined with other digital information in the data word bitstream. The data word bitstream may comprise, but not be limited to, a synchronization header, identification code, sensor values, and parity bits or a checksum. The data word bitstream is detected by an interrogator/tag reader 720 (FIG. 7) and the values of the sensors 404a–404d may be displayed from the information supplied by the interrogator/tag reader 720. The RFID tag device 302, memory array 314, ADC 312 and multiplexer 416 may be fabricated on the same semiconductor integrated circuit die, in combination on different integrated circuit dice packaged together in a single package, or separately in two or more integrated circuit packages connected together on a substrate such as a printed circuit board or printed wiring board (not illustrated).

Figure 5A:
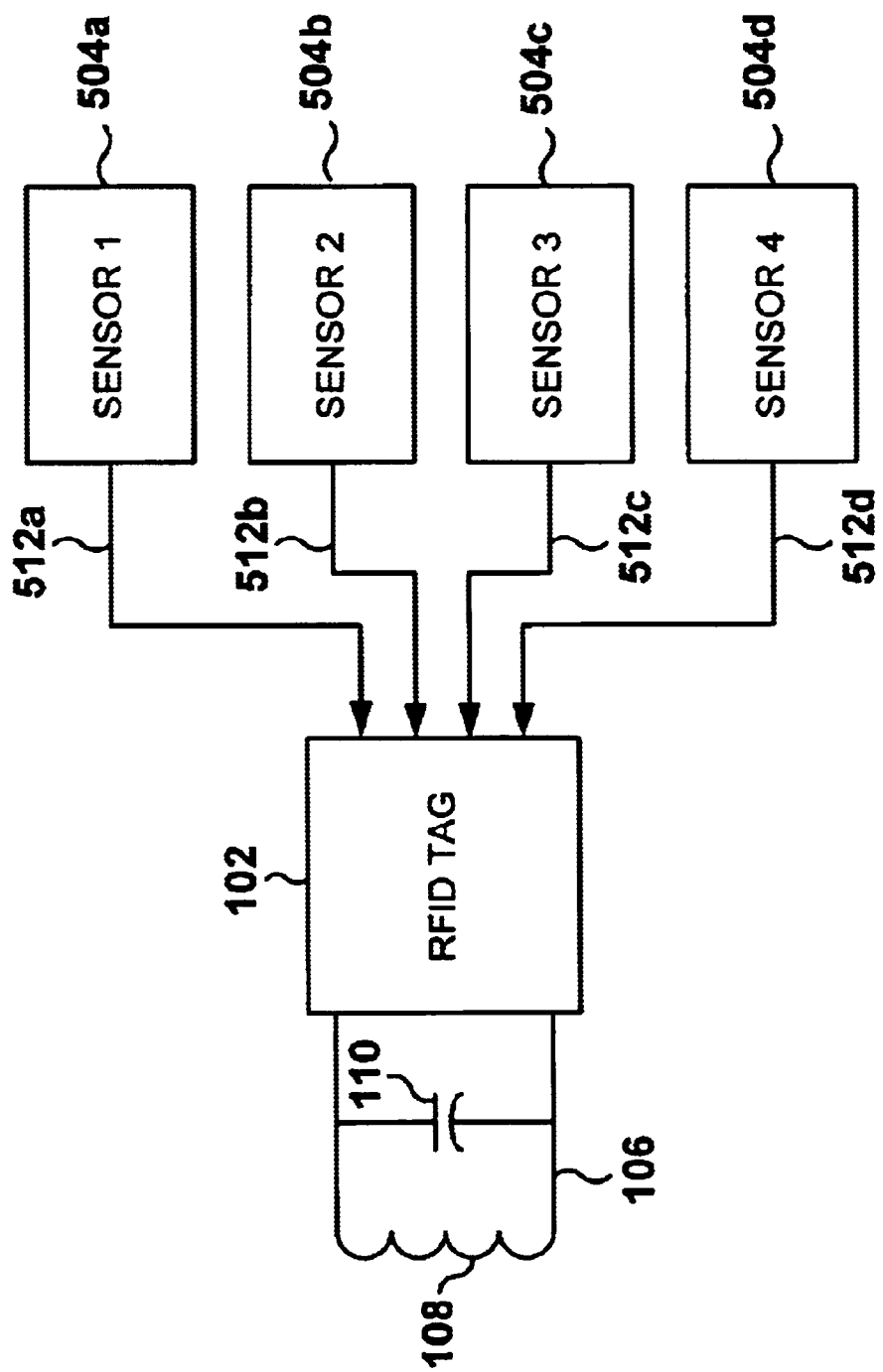
FIGS. 5A and 5B are schematic block diagrams of embodiments of the invention adapted for connection to a plurality of external sensors.
Figure 5B:
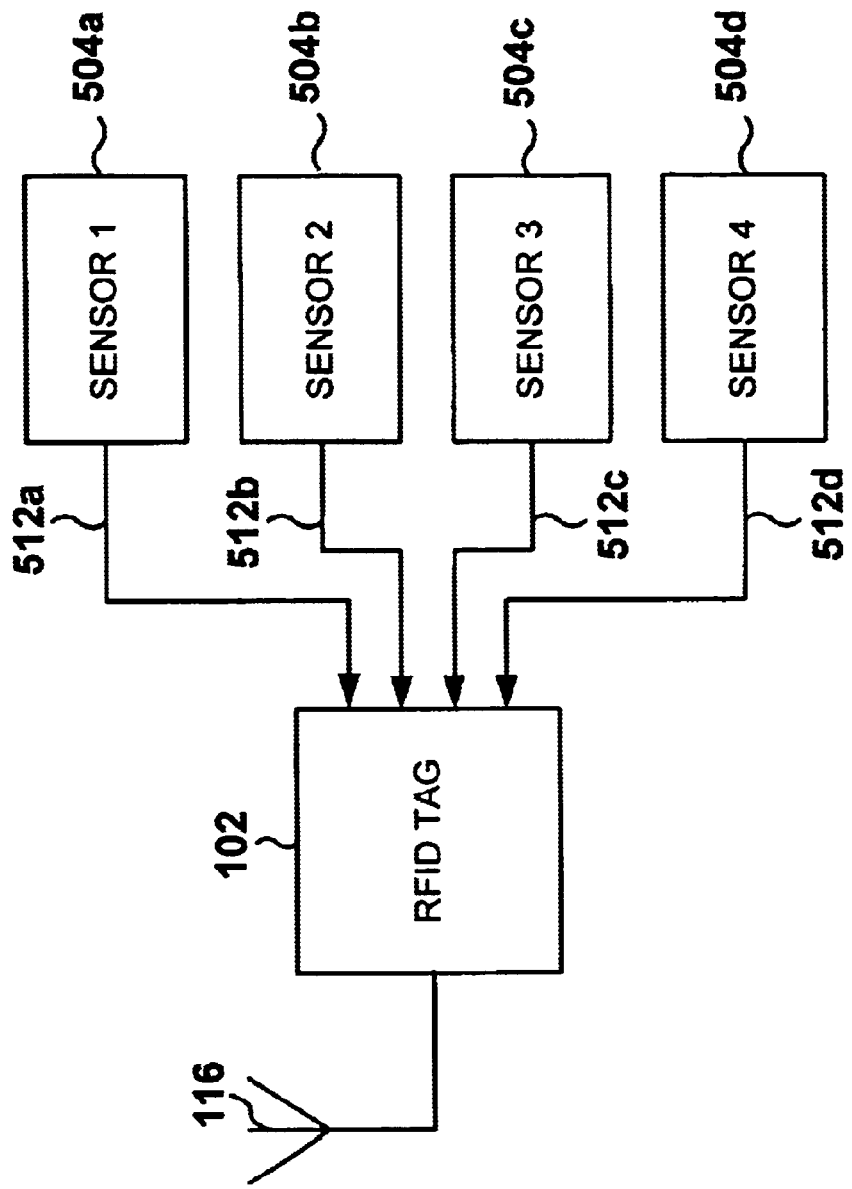

Referring now to FIGS. 5A and 5B, schematic block diagrams of embodiments of the invention, adapted for connection to a plurality of external sensors, are illustrated. An RFID tag device 102 comprises a parallel tuned RF circuit 106 made up of an inductor 108 and a capacitor 110 (FIG. 5A), or a RF ultra high frequency (UHF) or microwave antenna 116 (FIG. 5B). The RFID tag device 102 has a plurality of inputs 512a–512d adapted to receive signals from the plurality of sensors 504a–504d. The plurality of sensors 504a–504d may have two states, on or off, such as a switch, a transistor, a hall effect device, a photo-transistor and the like. The RFID tag device 102 may also provide power to the plurality of sensors 504a–504d, as described below. The RFID tag device 102 generates a data word bitstream that is read by an interrogator/tag reader 720 (see FIG. 7). Within this data word bitstream is information relating to signal values from the sensors 504a–504d. When the signal values of the sensors 504a–504d change, so does the respective information of the data word bitstream.

Referring to FIGS. 6A and 6B, schematic block diagrams of embodiments of the invention supplying power for operation of sensor(s) are illustrated. A sensor interface 618 has an input 612 adapted to receive a signal from the sensor 604, and to also supply power 620 to the sensor 604 for operation thereof. The sensor 604 may be digital or analog and operate as described above. The input 612 may be used for a dual purpose of a first function input before setting, for example, a lock function in the RFID tag device 302 and/or memory array 614 and a second function input after locking or writing to a particular register of the memory array 614, i.e., the first function input may be a reset and the second function input may be adapted for a sensor input. The input resistance of the dual purpose input 612 may also change, i.e., in the first function input a low resistance and in the second function input a high resistance, or visa-versa.

Figure 7A:
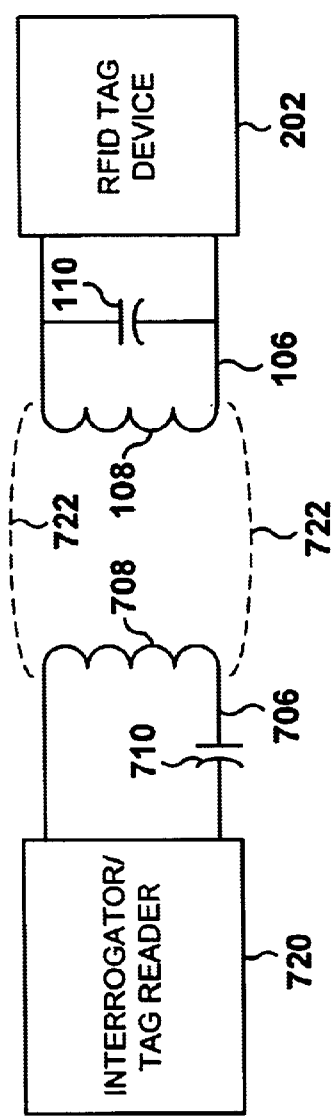
FIGS. 7A and 7B are schematic block diagrams representative of the inductive and RF embodiments of the invention and inductive and RF interrogator/tag readers, respectively.
Figure 7B:
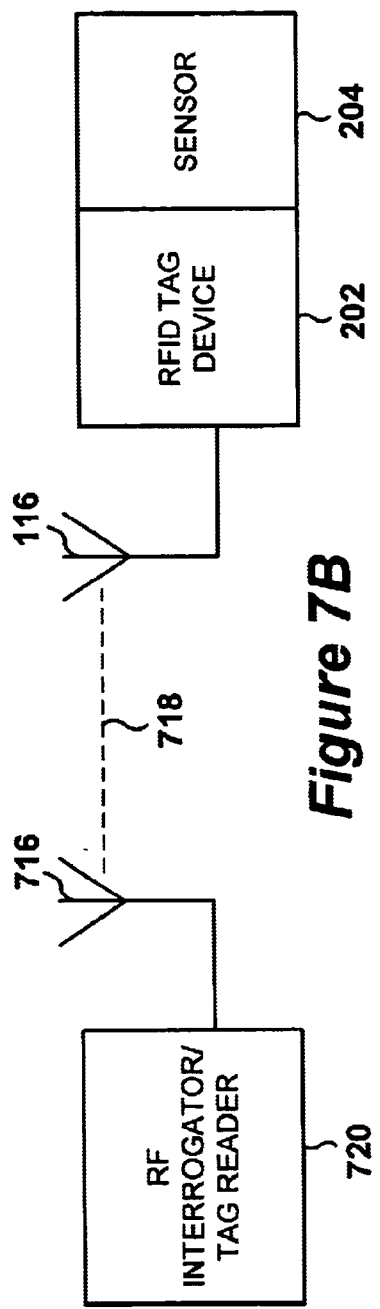

Referring to FIGS. 7A and 7B, schematic block diagrams representative of the embodiments of the invention and a radio frequency generator/interrogator/tag reader. The tuned circuit 706 comprises inductor 708 and capacitor 710 connected in series. RF generator/interrogator/tag reader 720 produces CW RF power across the tuned circuit 706 (FIG. 7A) or antenna 716 (FIG. 7B). This CW RF power is electro-magnetically coupled by alternating current action to the parallel tuned circuit 106 or antenna 116. The CW RF electro-magnetic power is generally represented by the numeral 722 (FIG. 7A) and the UHF/microwave power is generally represented by the numeral 718 (FIG. 7B). The RFID tag device 202 has circuits which convert some of the CW RF electro-magnetic power 722 or UHF/microwave power 718 into direct current power for use by the logic circuits of the RFID tag device 202 and for powering the circuits of the sensor 204.

Whenever the tuned circuit 106 of the RFID tag device 202 is in proximity to the tuned circuit 706 of the RF generator/interrogator/tag reader 720, a voltage amplitude across the tuned circuit 706 is reduced because the RFID tag device 202 loads the tuned circuit 706. If the tuned circuit 106 of the RFID tag device 202 is taken out of resonance by circuits therein, then the RFID tag device 202 does not load the turned circuit 706 and the voltage amplitude across the tuned circuit 706 increases back to what it was before the RFID tag device 202 came in proximity thereto. The RFID tag device 202 causes amplitude changes in the tuned circuit 706 so as to convey information in a serial data word bitstream of on/off pulses. The interrogator/tag reader 720 detects these CW RF amplitude changes and converts them into a detected serial data word bitstream of on/off pulses representative of the information from the RFID tag device 202. The antenna 716 works in a similar fashion.

Referring to FIGS. 8a and 8b, schematic tables of data word bitstreams for different sensor states, according to the invention, are illustrated. A data word represented by the tables of numbers of FIGS. 8a and 8b may be transmitted as a serial bitstream as described hereinabove. Row 802 is a hexadecimal representation and row 804 is a binary representation of the data word. A data header may be comprised of four-bit groups 806, 808 and 810. A data/tag serial number may be comprised of the remaining four-bit groups 812–840. The data header and data/tag serial number data word may be a non-inverted data stream for a first state of the sensor and an inverted data stream for a second state of the sensor. The first state is represented by groups 806–840 and the second state is represented by groups 806a–840a. This may effectively be used to convey, for example, a switch position to the interrogator/tag reader 720. The interrogator/tag reader 720 (FIG. 7) searches detected bits to find a correct header and/or checksum in order to find and validate the data word. If the tag reader 720 cannot find the data word pattern it can search for the inverse of the anticipated bitstream, and, if found, the sensor is in the second state.

Referring to FIGS. 9a–9c, schematic tables of data word bitstreams based upon changing sensor inputs are illustrated. A data word represented by the tables of numbers of FIGS. 9a, 9b and 9c may be transmitted as a serial bitstream as described hereinabove. A data header may be comprised of the four-bit groups 806, 808 and 810. A data/tag serial number may be comprised of the four-bit groups 812–836. A digital value representing the analog sensor input value may be comprised of four-bit groups 950 and 952. A checksum or parity bits may be comprised of x bits 954. The x bits 954 may be used for verification or correction of the data word or the entire bitstream. In FIG. 9a, the four-bit groups 950a and 952a represent a sensor value of zero scale. In FIG. 9b, the four-bit groups 950b and 952b represent a sensor value of half scale. In FIG. 9c, the four-bit groups 950c and 952c represent a sensor value of full scale.

The above embodiments of the invention may be used to keep track of the status and/or condition of an article of manufacture or apparatus. For example but not limitation: 1) rental car identification, amount of gas in the rental car tank, mileage, etc.; 2) pressure, temperature and/or weight of a truck, ship or railroad car; 3) tire serial number and air pressure, and 4) animal body temperature, blood chemistry, heart rate, etc.

Figure 10:
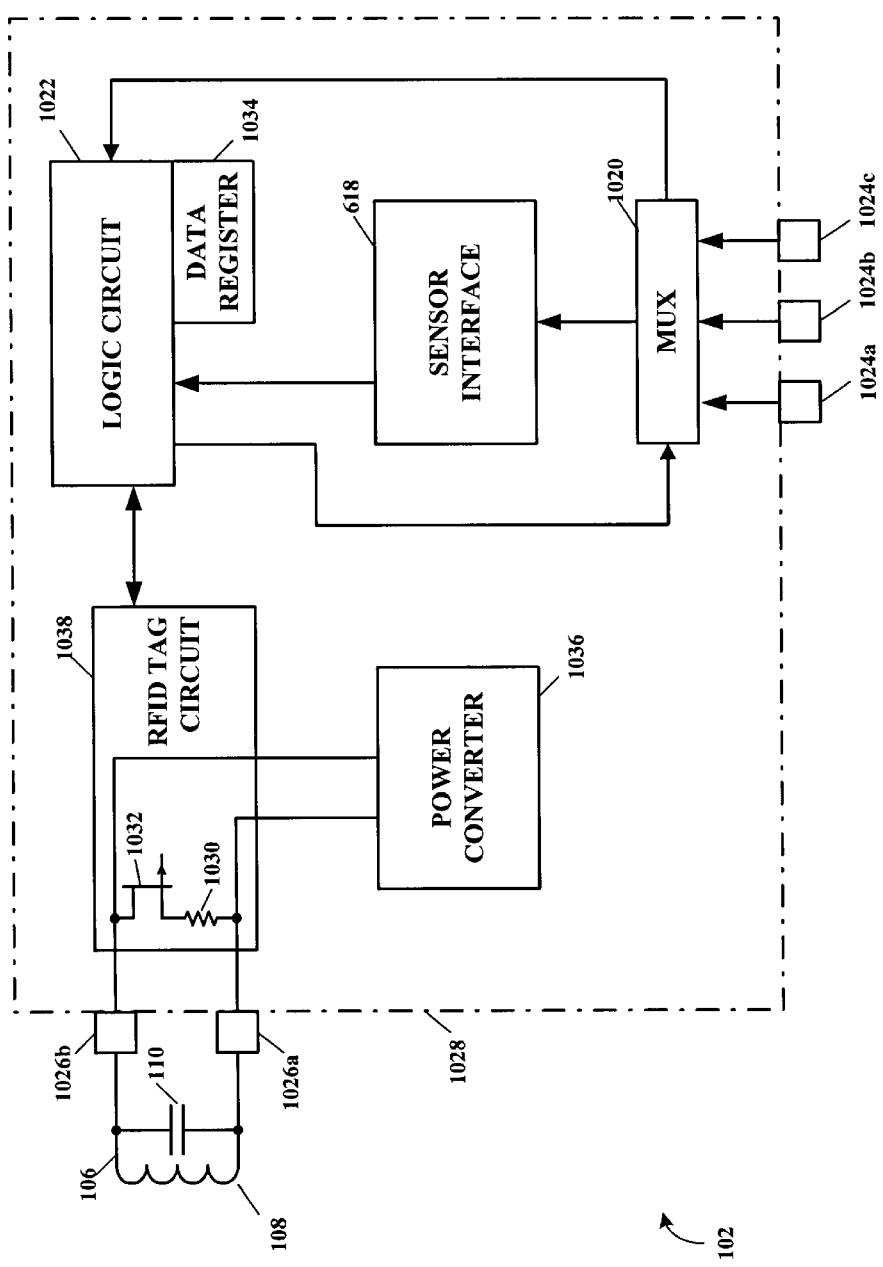
FIG. 10 is a schematic block diagram of a radio frequency identification tag device with a plurality of dual function inputs.

Referring to FIG. 10, depicted is a schematic block diagram of a radio frequency identification (RFID) tag device with a plurality of dual function inputs that may be used for sensor inputs and programming functions. The RFID tag device 102 may comprise a RFID tag circuit 1038, a power converter 1036, a logic circuit 1022, a data register 1024, a sensor interface 618 and a multiplexer 1020. The logic circuit 1022 has the data register 1024 for reading and/or writing information (see FIGS. 8 and 9). The RFID tag device 102 may be fabricated on an integrated circuit die 1028 or a plurality of integrated circuit dice (not shown). The die 1028 or dice may be packaged or unpackaged. Connections 1024 and 1026 are used to couple the aforementioned circuits to external component, devices and/or circuits.

Coil 108 and capacitor 110 form a parallel tuned RF circuit 106. An antenna 116 (FIG. 5B) may be used in place of the RF circuit 106, as described hereinabove. The parallel tuned RF circuit 106 may be coupled to the RFID tag circuit 1038 through connections 1026a and 1026b. The RFID tag circuit 1038 may comprise a transistor 1032 and a resistor 1030. The transistor 1032 may be used as a RF switch to connect the resistor 1030 across the parallel tuned RF circuit 106 so as to load and unload the RF circuit 106 during operation of the RFID tag device 102. The power converter 1036 converts a portion of the received RF signal in a voltage that may be used to supply the active circuits of the RFID tag device 102 and/or the sensors (not shown).

The logic circuit 1022 may control the RFID tag circuit 1038, the data register 1034 and the multiplexer 1020. The multiplexer 1020 may be configured so that the connections 1024 may be used for more than one function, e.g., dual-function. The multiplexer 1020 may couple the connections 1024 to the logic circuit 1022, for example, programming purposes, and may couple the connections 1024 to the sensor interface 618 for operational purposes. Have dual-function connections on the integrated circuit 1028 allows fewer connections and more efficient utilization of integrated circuit die area and/or integrated circuit package connection requirements. A plurality of sensors (not shown) may be coupled to the sensors through the connections 1024 and the multiplexer 1020.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A radio frequency identification tag device having a sensor input, comprising:

a radio frequency tuned circuit;

a logic circuit having a data register;

a radio frequency switch circuit for loading and unloading said radio frequency tuned circuit;

a sensor input circuit;

at least one dual function input, wherein said at least one dual function input is coupled to said sensor input circuit and said logic circuit so that the at least one dual function input may be used for programming or testing when in a first function and as another sensor input circuit when in a second function; and a power converter circuit for converting radio frequency power into direct current power for powering said circuits of said radio frequency identification tag device; wherein, said sensor input circuit being used to modify the data register contents, and said logic circuit using the data register contents to control said radio frequency switch circuit.

2. The radio frequency identification tag device of claim 1, further comprising a header value in said data register, wherein the header value controls said radio frequency switch circuit.

3. The radio frequency identification tag device of claim 1, further comprising an identification value in said data register, wherein the header value controls said radio frequency switch circuit.

4. The radio frequency identification tag device of claim 1, further comprising a parity value in said data register, wherein the parity value controls said radio frequency switch circuit.

5. The radio frequency identification tag device of claim 1, further comprising a checksum value in said data register, wherein the checksum value controls said radio frequency switch circuit.

6. The radio frequency identification tag device of claim 1, wherein the data register contents are modified by inverting the bit pattern therein.

7. The radio frequency identification tag device of claim 1, wherein said radio frequency switch circuit is controlled by a serial data word bitstream.

8. The radio frequency identification tag device of claim 1, wherein said sensor input circuit is an analog input circuit.

9. The radio frequency identification tag device of claim 8, wherein said sensor input circuit is an analog to digital converter.

10. The radio frequency identification tag device of claim 1, wherein said sensor input circuit is a digital input circuit having a first input level and a second input level.

11. The radio frequency identification tag device of claim 10, wherein the data register contains a binary bit pattern when said digital input circuit is at the first input level, and an inverted binary bit pattern when said digital input circuit is at the second input level.

12. The radio frequency identification tag device of claim 10, wherein said digital input circuit senses the first and second input levels as first and second voltages, respectively.

13. The radio frequency identification tag device of claim 10, wherein said digital input circuit senses the first and second input levels as first and second currents, respectively.

14. The radio frequency identification tag device of claim 10, wherein said digital input circuit senses the first and second input levels as first and second resistances, respectively.

15. The radio frequency identification tag device of claim 1, wherein said sensor input circuit is a plurality of sensor input circuits.

16. The radio frequency identification tag device of claim 15, wherein said plurality of sensor input circuits are a plurality of inputs of an analog input multiplexer.

17. The radio frequency identification tag device of claim 16, further comprising an analog to digital converter having an analog input connected to said analog input multiplexer output and a digital output value stored in the data register.

18. The radio frequency identification tag device of claim 1, further comprising a power output from said power converter circuit for powering a sensor.

19. The radio frequency identification tag device of claim 1, further comprising an un-packaged integrated circuit die.

20. The radio frequency identification tag device of claim 1, further comprising an integrated circuit package.

21. The radio frequency identification tag device of claim 1, further comprising at least one integrated circuit package on a printed wiring board.

22. The radio frequency identification tag device of claim 1, wherein said radio frequency tuned circuit comprises an inductor and capacitor.

23. The radio frequency identification tag device of claim 1, wherein said radio frequency tuned circuit comprises a radio frequency antenna.

24. A system for identifying and reading a sensor value, said system comprising:

a radio frequency identification tag device having a sensor input, a radio frequency tuned circuit, a logic circuit having a data register, a radio frequency switch circuit for loading and unloading said radio frequency tuned circuit, at least one dual function input, wherein said at least one dual function input is coupled to said sensor input circuit and said logic circuit so that the at least one dual function input may be used for programming or testing when in a first function and as another sensor input circuit when in a second function; and a power converter circuit for converting radio frequency power into direct current power for powering said circuits of said radio frequency identification tag device;

wherein, said sensor input circuit being used to modify the data register contents, and said logic circuit using the data register contents to control said radio frequency switch circuit;

a sensor for measuring a process value, said sensor connected to said at least one dual function input;

a radio frequency interrogator for generating radio frequency power at a frequency compatible with said tuned circuit; and an identification tag reader connected to said radio frequency interrogator;

said identification tag reader detecting amplitude variations of the radio frequency power for determining the data register contents of said radio frequency tag device.

25. The system of claim 24, wherein the process value is selected from the group consisting of speed of a vehicle, amount of gasoline in the vehicle tank, mileage of the vehicle and identification of the vehicle.

26. The system of claim 24, wherein the process value is selected from the group consisting of pressure, temperature and weight.

27. The system of claim 24, wherein the process value is selected from the group consisting of body temperature, blood chemistry and heart rate.

28. The system of claim 24, wherein said sensor is a plurality of sensors, said sensor input is a plurality of sensor inputs and the process value is a plurality of process values.

29. The system of claim 25, wherein the plurality of process values are amount of gasoline in a vehicle gas tank, mileage of the vehicle and identification of the vehicle.

30. The system of claim 24, wherein the process value is selected from the group consisting of voltage, current, resistance, frequency, pressure, temperature, acceleration, vibration, moisture content, gas percentage, density, flow rate, light intensity, sound intensity, radiation, magnetic flux and pH.

* * * * *